United States Patent [19]
Sekizawa et al.

[11] Patent Number: 5,748,110
[45] Date of Patent: May 5, 1998

[54] ANGULAR INPUT INFORMATION SYSTEM RELATIVE TO A TABLET FOR DETERMINING AN INCLINE ANGLE OF A POINTER OR STYLUS

[75] Inventors: Yasushi Sekizawa; Takahiko Funahashi, both of Otone-machi, Japan

[73] Assignee: Wacom Co., Ltd., Japan

[21] Appl. No.: 500,086

[22] Filed: Jul. 10, 1995

Related U.S. Application Data

[63] Continuation-in-part of Ser. No. 421,270, Apr. 13, 1995.

[30] Foreign Application Priority Data

May 18, 1995 [JP] Japan ................... 7-143882

[51] Int. Cl.$^6$ .................... H03M 1/00; G08C 21/00
[52] U.S. Cl. ................ 341/5; 345/173; 178/18
[58] Field of Search ................ 341/5; 178/18, 178/19; 345/173

[56] References Cited

U.S. PATENT DOCUMENTS

| | | | |
|---|---|---|---|
| 4,477,877 | 10/1984 | Nakamura et al. | 178/19 |
| 4,939,318 | 7/1990 | Watson et al. | 178/19 |
| 5,109,225 | 4/1992 | Morita | 341/5 |
| 5,198,623 | 3/1993 | Landmeier | 178/19 |

FOREIGN PATENT DOCUMENTS

| | | |
|---|---|---|
| 5816506 | 3/1983 | Japan . |
| 253805 | 11/1990 | Japan . |
| 367320 | 3/1991 | Japan . |
| 3147012 | 6/1991 | Japan . |
| 5241722 | 9/1993 | Japan . |

*Primary Examiner*—Howard L. Williams
*Attorney, Agent, or Firm*—Joseph W. Berenato, III

[57] ABSTRACT

A coordinate detecting device and an angle information detecting method which are capable of detecting tilt angles of a stylus pen with high accuracy. A coordinate detecting device is made up of a plurality of sensor coils and a position indicator housing an electromagnetic coupling means, and detects coordinates and tilt angles of the position indicator by sensing an induced voltage developed in the sensor coil by means of electromagnetic interaction. The coordinate detecting device is also provided with an angle information detecting means. This angle information detecting means correct errors in a value of a predetermined function including main and sub-peaks, the errors arising from a difference between a main peak induced voltage distribution and a sub-peak induced voltage distribution within a detection width of one sensor coil, by converting either the main peak induced voltage distribution or the sub-peak induced voltage distribution so as to be similar to the other one. Then, the angle information detecting means calculate tilt angles of the position indicator using a predetermined function including the sub-peak induced voltage and the corrected main peak induced voltage.

22 Claims, 7 Drawing Sheets

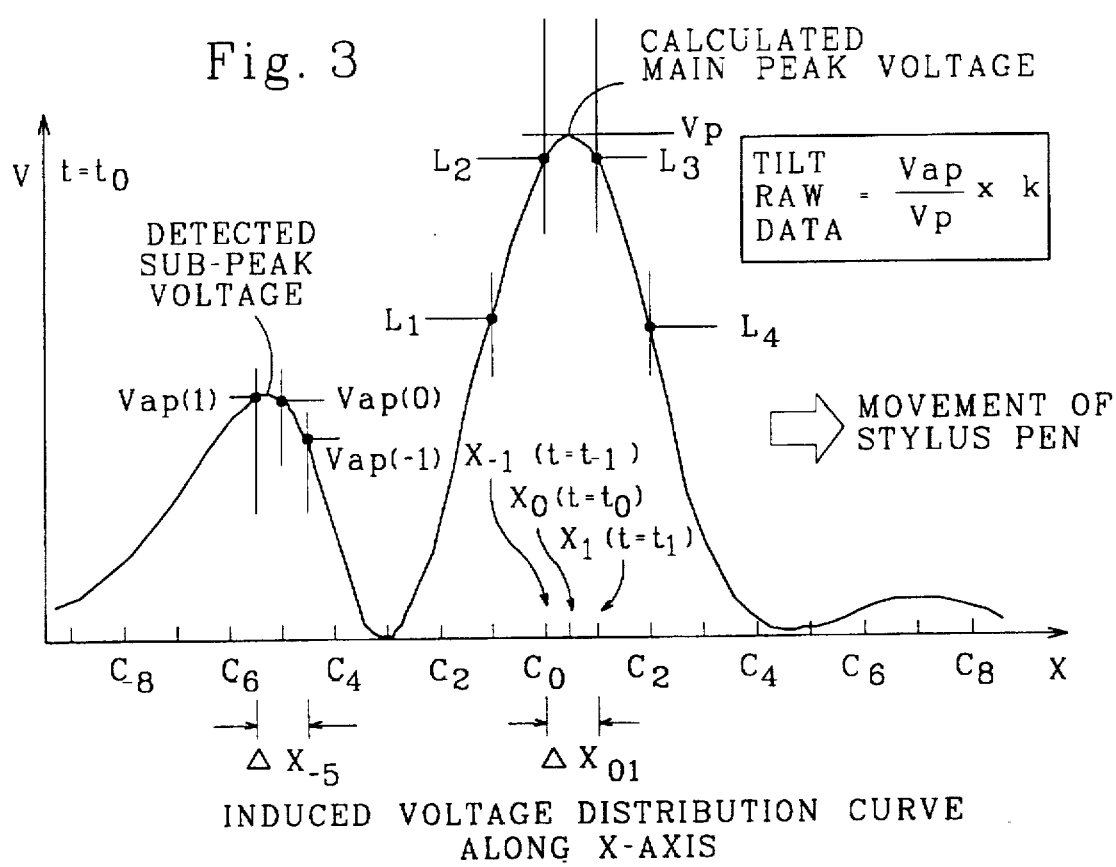
INDUCED VOLTAGE DISTRIBUTION CURVE ALONG X-AXIS
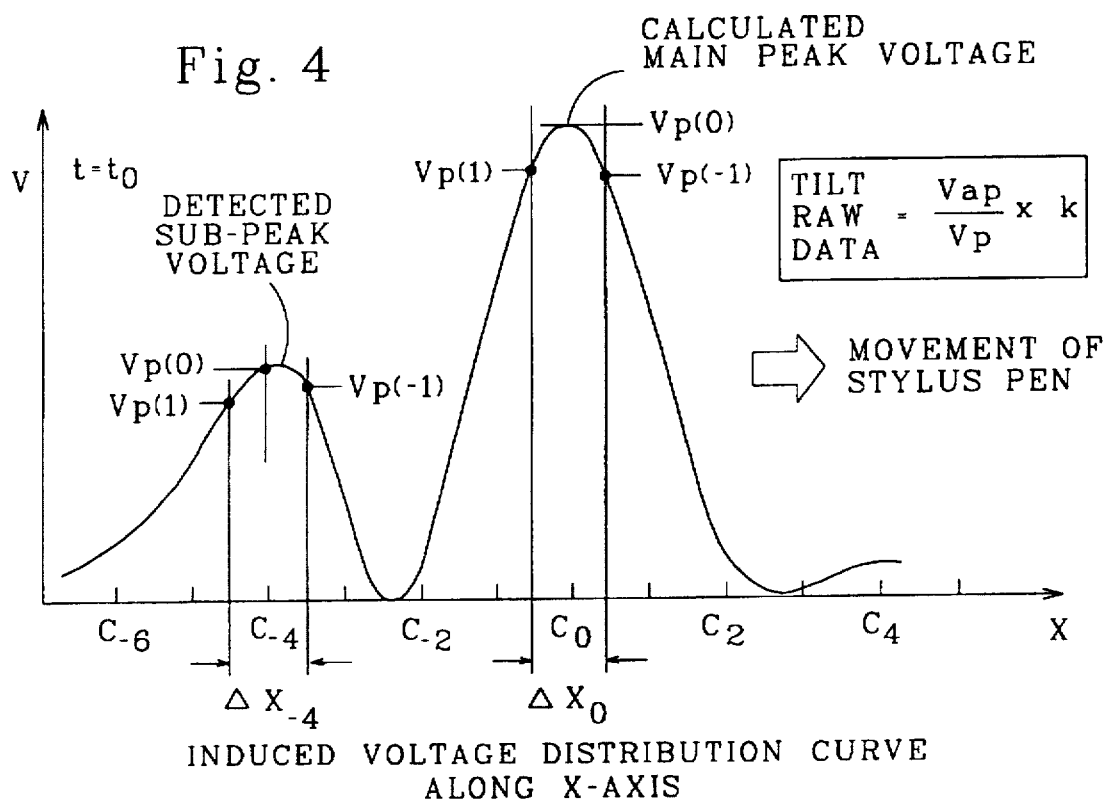
INDUCED VOLTAGE DISTRIBUTION CURVE ALONG X-AXIS Fig. 10A
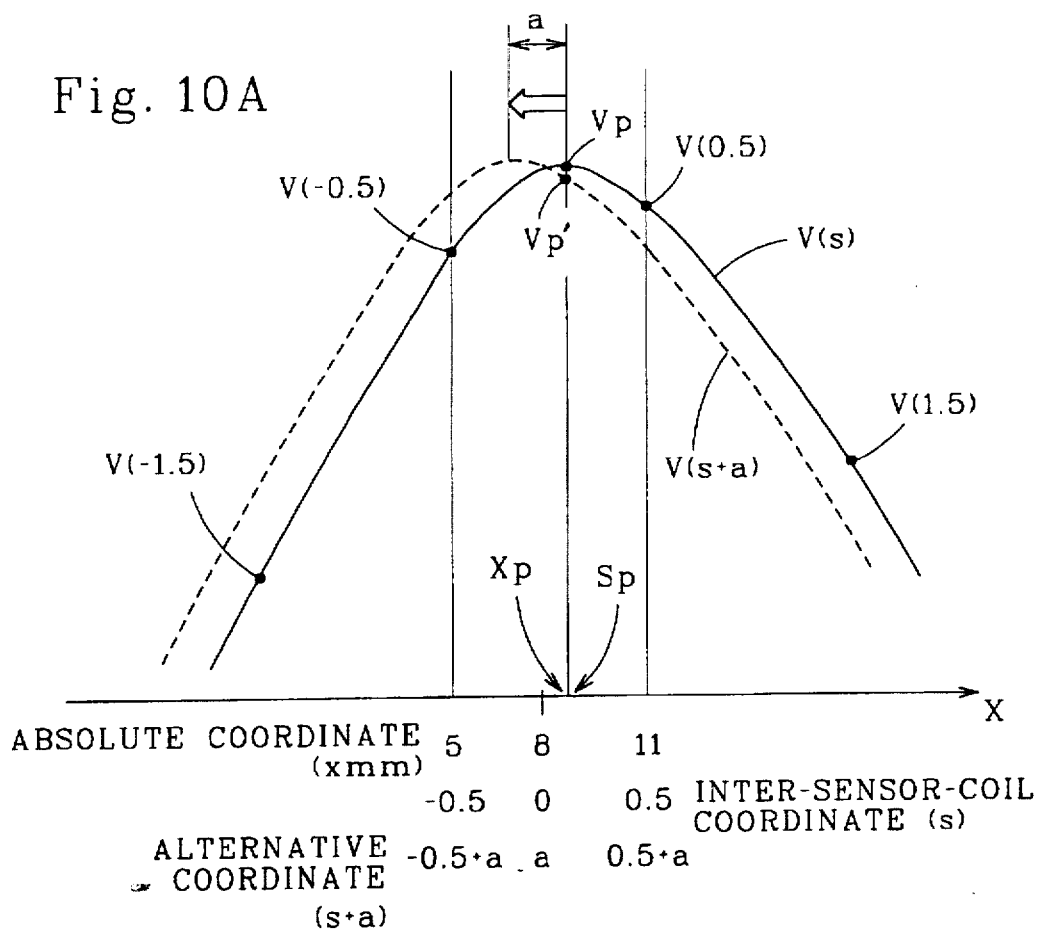
Fig. 10B
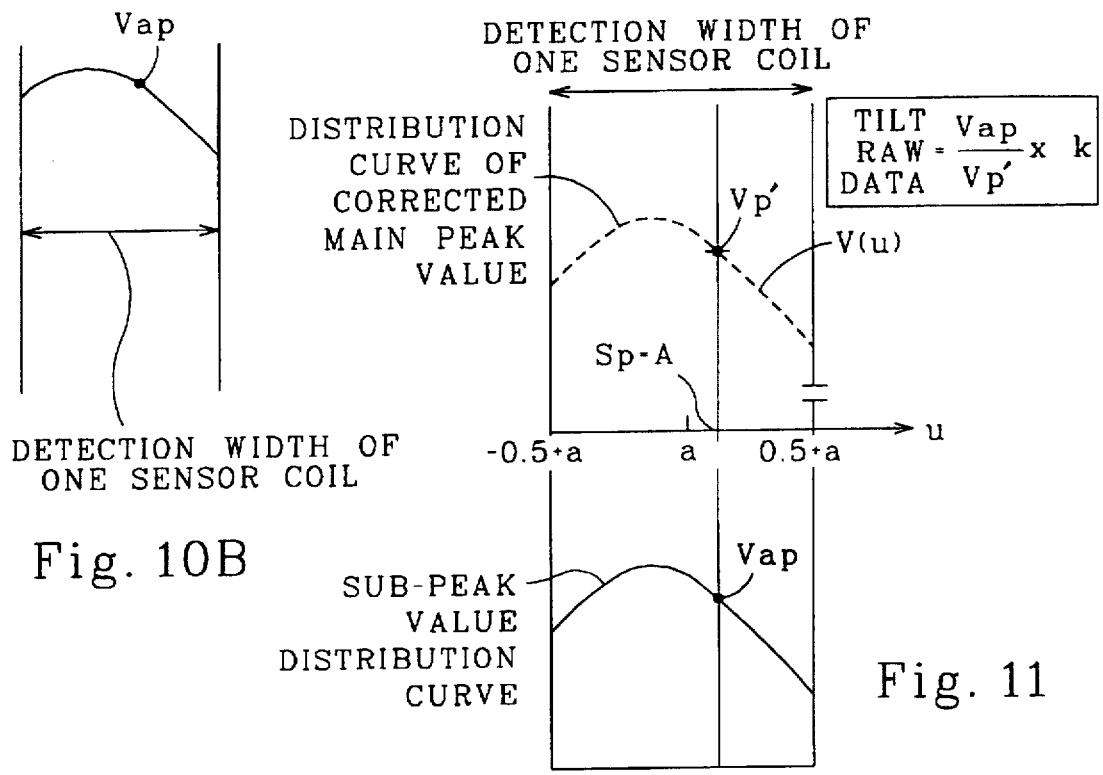
Fig. 11

ANGULAR INPUT INFORMATION SYSTEM RELATIVE TO A TABLET FOR DETERMINING AN INCLINE ANGLE OF A POINTER OR STYLUS

The instant application is a continuation-in-part (CIP) of U.S. Ser. No. 08/421,270, pending, which was filed on Apr. 13, 1995.

BACKGROUND OF THE INVENTION

1. Field of the Invention

The present invention relates to a coordinate detecting device for detecting two-dimensional coordinate information such as a digitizer or a tablet, and more particularly to a coordinate detecting device having an angle information detecting function capable of detecting the degree and direction of a tilt angle of a pen type position indicator (commonly referred to as a stylus pen), and an angle information detecting method therefor.

2. Description of the Prior Art

Various types of position detecting systems for use in a coordinate detecting device are already known. One example of these position detecting systems is an electromagnetic transfer method disclosed in Japanese Patent Application Nos. S61-213970 and H1-282852.

FIG. 1 is a schematic diagram for illustrating the principal operation of a coordinate detecting device employing the electromagnetic transfer method. The coordinate detecting device employing this method is made up of a sensor section (for simplicity, only a group of X-axis sensor coils are shown in the drawing) consisting of a plurality of sensor coils arranged side by side in the direction of position detection (in both X-axis and Y-axis directions) so as to constitute a sensor plane, and a position indicator such as a stylus pen or a cursor housing an electromagnetic coupling means such as a coil or a resonance circuit. In the electromagnetic transfer method, a coordinate value of a position is indicated by a position indicator based on a signal received as a result of the transfer of an electromagnetic wave between one sensor coil in the sensor plane and the position indicator. Usually, in addition to the acquisition of data for a coordinate value of the indicated position, the coordinate detecting device has another object such as the acquisition of switching information for specifying various operations at the indicated position. To achieve this object, the position indicator also houses a means for inputting switching information. For example, one input means for switching information is made of a switch which is turned on when the tip end of the nib of the stylus pen is brought into contact with the sensor plane. When turned on, this type of switch slightly varies resonance conditions of the coil or the resonance circuit by the addition of an element such as a capacitor.

In the sensor section, a pair of sensor coil groups are respectively arranged along the X-axis and the Y-axis in such a way as to cross each other at right angles.

Referring to FIG. 1, the process of position detection in the electromagnetic transfer method will now be explained. A high frequency signal is sent to one selected sensor coil from a high frequency signal generation circuit, and as a result an electromagnetic wave (a transmission signal) is emitted from this sensor coil. The thus emitted electromagnetic wave causes the resonance circuit, or the like, housed in the position indicator to resonate (when the position indicator is situated on these sensor coils). When the emission of the electromagnetic wave from the sensor coil is terminated (that is, the supply of the high frequency signal is stopped), a responding electromagnetic wave is emitted from the resonance circuit housed in the position indicator. This response electromagnetic wave brings about the generation of an induced voltage in the sensor coil. This induced voltage is the received signal. This received signal is delivered to a signal processing section via a receiving circuit, and the amplitude and phase of this signal are analyzed.

The transmission and reception of electromagnetic waves done for one sensor coil is repeatedly carried out for each of the plurality of sensor coils arranged in the sensor section by alternately switching them one after the other in the direction of the position detection. This alternate switching of the sensor coils will be hereinafter referred to as scanning.

The position detecting device is provided with a sensor coil switching section consisting of multiplexers for selecting, i.e., switching the plurality of sensor coils. The switching action of the sensor coil switching section and the transmission and reception of electromagnetic waves are controlled by a signal control section (not shown) of the coordinate detecting device.

The position detection process covers all processes from the instant when coordinate information of the position indicator is not obtained at all to the instant when the accurate X and Y coordinates of the position indicator are calculated. ALL SCANNING is first started for scanning all of the sensor coils arranged in the sensor plane. This ALL SCANNING may be said to be a type of coarse detection process. The distribution of induced voltages over the sensor plane is obtained on the basis of an induced voltage from each sensor coil. When the position indicator is positioned at a level lower than a detectable height above the sensor plane, the maximum peak value of the distribution of induced voltages appears at a sensor coil closest to the position indicator. At the same time, a waveform appears which is substantially centered at the sensor coil showing the maximum peak value, among a group of several sensor coils. In this way, it is possible to decide a substantial position of the position indicator. The detection process proceeds to sector scan. In this sector scan, the previously mentioned transmission and reception of electromagnetic waves is repeated for the sensor coil showing the maximum peak value and several sensor coils adjacent to this sensor coil. If the maximum value is obtained again, the presence of the position indicator will be acknowledged. Calculation including interpolation is carried out in the signal processing section based on data for each induced voltage obtained as a result of the sector scan, whereby the coordinates of the position indicator are accurately determined. To obtain more accurate data, sector scan is commonly repeated several times. This sector scan may be said to be a fine detail detection process.

There is a method in which a position indicator receives an electromagnetic wave emitted from a sensor plane, or an electromagnetically activated system in which a sensor plane simply receives an electromagnetic wave emitted from the position indicator. Moreover, there is an intersection detecting method in which an electromagnetic wave emitted from a sensor coil in the X-axis direction is received by a sensor coil in the Y-axis direction. Still another method is a self-oscillation detecting method disclosed in Japanese Patent Application Laid-open No. H5-241722. In this self-oscillation detecting method, a positive feedback loop is established between amplifiers respectively connected to sensor coils in the X-axis and Y-axis directions which are not electromagnetically coupled together as a result of electromagnetic coupling between them with the resonance circuit of the position indicator. The electromagnetic coupling between the position indicator and the sensor coils brings about the self-oscillation of the amplifiers, and hence a resultant oscillation signal is utilized in detecting the position of the position indicator.

The utilization of an induced voltage caused by electromagnetic induction is common to these several types of position detecting methods.

In the above, for simplicity, only the processing of the maximum value (which will be hereinafter referred to as a detected main peak voltage value or a main peak value) in the distribution of induced voltages was referred to. However, as disclosed in Japanese Patent Publication No. S58-16506 and Japanese Patent Application Laid-open No. H3-67320, sub-peaks showing maximum values smaller than the main peak value are observed on both sides of the main peak value in the distribution of induced voltages. FIG. 2 shows an example of the sub-peaks. A main peak representing a main peak value $V_p$, and a pair of sub-peaks which represent sub-peak values $V_{pa}$ and $V_{pb}$ and appear on both sides of the main peak $V_p$, are shown in FIG. 2. It is known that the magnitudes of the pair of sub-peaks and the ratio of the sub-peaks to the main peak vary depending on a tilt angle θ of the axis of the stylus pen (i.e., a tilt angle in relation to the axis perpendicular to the sensor plane).

For example, the greater a tilt angle $θ_x$ of the stylus pen on the X-axis becomes, the smaller the main peak value $V_p$ becomes, thereby resulting in a greater sub-peak value $V_{pa}$. Therefore, provided that the relationship between $K_x=V_p/V_{pa}$ and the tilt angle $θ_x$ of the stylus pen is previously obtained, it will be possible to find the tilt angle $θ_x$ in the X-axis direction by obtaining $K_x$. Similarly, even in the case of the distribution of induced voltages along the Y-axis, it is also possible to obtain a tilt angle $θ_y$ in the Y-axis direction by calculating $K_y=V_p/V_{pa}$ from the main peak value $V_p$ and the sub-peak value $V_{pa}$. The tilt angle θ and direction of inclination of the stylus pen are obtained from the tilt angles $θ_x$ and $θ_y$ of the respective axes. These type of data for the inclination of the stylus pen are utilized in correcting an error in coordinate values, or in assigning various operations or conditions to an indicated position in the same manner as the switching information.

Conventionally, when data for the sub-peaks are utilized, calculation including interpolation similar to that practiced for the main peak is carried out for the sub-peaks to be used, whereby accurate sub-peak values are calculated, and coordinate values corresponding to these sub-peak values are also calculated as required. For this reason, data obtained from several sensor coils were necessary to execute the interpolation calculation with respect to each of the sub-peaks required as data. For example, in such a case as shown in FIG. 2, it is necessary to scan at least three sensor coils consisting of a sensor coil $C_{-4}$ showing the maximum value and sensor coils $C_{-5}$ and $C_{-3}$ on both sides of the sensor coil $C_{-4}$ in order to obtain a correct sub-peak value $V_{pa}$. Similarly, in order to obtain a correct sub-peak value $V_{pb}$, it is necessary to scan at least a sensor coil $C_4$ showing the maximum value and sensor coils $C_3$ and $C_5$ on both sides of the sensor coil $C_4$.

However, if there is a large number of sensor coils to be selected during the sector scan, the scanning process will take a longer time, and a load on the signal processing will also be increased because of an increase in the quantity of processing of data obtained as a result of the sector scan. This eventually results in a drop in transmission rate of data to a host computer. Usually, a calculation routine, including calculation of coordinates and inclination based on data obtained as a result of one sector scan, is executed every time this one sector scan has been completed. The result of this calculation is then delivered to the host processor (the host machine). Further, the sector scan is repeated several times for one indicated position, and hence it is desirable that the execution of sector scan repeated several times and the completion of each calculation routine be finished in a least possible time. When the position indicator is moving very rapidly, the indicated position may change while the sector scan and a calculation routine associated with this sector scan are being executed. In effect, since it is necessary to execute sector scan for both X-axis and Y-axis directions, an inevitable time difference arises between the instant when the sector scan is carried out for the X-axis and the instant when the sector scan is carried out for the Y-axis. The indicated position may change within this time difference.

For this reason, a scanning method which requires as small a number of sensor coils as possible to be subjected to sector scanning is desirable. One possible method is a method in which only a sensor coil showing the maximum value is scanned for a sub-peak value. For instance, in the case of the peaks shown in FIG. 2, a voltage obtained from the sensor coil $C_{-4}$ is taken as the sub-peak value Vpa for the left side, and a voltage obtained from the sensor coil $C_4$ is taken as the sub-peak value $V_{pb}$ for the right side. In addition, it is known by experience that the two sensor coils, from which the maximum sub-peak values $V_{pa}$ and $V_{pb}$ are obtained, are each spaced substantially the same distance away from the sensor coil from which the maximum main peak value $V_p$ is obtained. Accordingly, induced voltages obtained from sensor coils on both sides of the sensor coil which provides the maximum main peak value $V_p$ are taken as the sub-peak values $V_{pa}$ and $V_{pb}$, the sub-peak sensor coils being spaced apart from the main peak sensor coil by simply a predetermined number "n" previously obtained from the main peak sensor coil. As a result, the selection of sensor coils to be scanned to obtain sub-peak values can be simplified.

However, when the induced voltage of one sensor coil is directly taken as the sub-peak value, this sub-peak value does not represent a true sub-peak value but includes an error. A problem caused by this error will now be described with reference to FIGS. 3 and 4. FIGS. 3 and 4 are graphs showing a distribution curve of induced voltages obtained on the basis of an induced voltage obtained for each sensor coil at a certain time point ($t=t_o$) when the stylus pen is moved in the plus direction along the X-axis at a constant speed and at a constant level, for example, while being inclined $θ_x$ in the minus direction along the X-axis (see FIG. 2).

FIG. 3 is a graph showing a main peak value acquired by interpolation calculation using four induced voltages $L_1$ to $L_4$ obtained from four sensor coils. The distribution curve of induced voltages is shifted intact in the plus direction as the stylus pen moves in the plus direction (from left to right) along the X-axis in FIG. 3. The length designated by $ΔX_{01}$ represents one detection width from which the main peak value $V_p$ is obtained, among a predetermined set of four sensor coils. The length matches with an interval between the sensor coils. For example, when the main peak value $V_p$ is determined from the set of four sensor coils $C_{-1}$ to $C_2$, the coordinates of the main peak value are present between a sensor coil $C_0$ and a sensor coil $C_1$. Assume that the time period, during which the stylus pen is situated between the sensor coil $C_0$ and the sensor coil $C_1$, is $t=t_{-1}$ to $t_1$. Since the main peak value $V_p$ is obtained by interpolation calculation, the main peak value Vp within the time period $t_{-1}$ to $t_1$ is constant. This main peak value is indicated as "a main peak voltage calculation value" by a thick line in the drawing.

A sub-peak value $V_{ap}$ is a value of an induced voltage obtained from a sensor coil spaced a predetermined apart from the main peak. In other words, a voltage detected from a sensor coil $C_{-5}$ is directly used as a left-side sub-peak value. A detection width designated by $\Delta X_{-5}$ also matches with a detection width of the sensor coil $C_{-5}$. This is because a sensor coil spaced a predetermined distance away from the main peak is determined as a sensor coil for obtaining a sub-peak value. Therefore, when the set of the sensor coils for the main peak is switched to another set, the sensor coil for sub-peak is also switched to another sensor coil. For example, the instant when the set of four sensor coils $C_{-1}$ to $C_2$ for use in detecting a main peak value is switched to another set of four sensor coils $C_0$ to $C_3$ as the stylus pen moves, the sensor coil $C_{-5}$ for detecting a sub-peak is switched to a sensor coil $C_{-4}$. However, the main peak value $V_p$ obtained as a result of interpolation calculation is always constant, whereas the sub-peak value $V_{ap}$ varies within the period for detection. On the assumption that the distribution curve of induced voltages shown in FIG. 3 shifts in the plus direction as the stylus pen moves, a sub-peak value $V_{ap}$ detected from the sensor coil $C_{-5}$ changes from $V_{ap}(-1)$ at $t=t_{-1}$ to $V_{ap}(0)$ at $t=t_0$, and further to $V_{ap}(1)$ at $t=t_1$. This sub-peak value is indicated as "a detected sub-peak voltage" by a thick line in the drawing. In this way, when the sub-peak value is taken as a value detected from one sensor coil, an induced voltage of the sub-peak is distributed within the detection width for one sensor coil. This implies that the data for the sub-peak value includes level errors.

Because of this distribution of the sub-peak values within the detection width, tilt raw data $(V_{ap}/V_p) \times k$ (k: constant) based on the ratio of the sub-peak value to the main peak value also includes errors, and hence the angle and direction of inclination of the stylus pen, calculated using the tilt raw data, also includes errors.

In the case shown in FIG. 4, the maximum value obtained from one sensor coil closest to the indicator is used as the main peak value $V_p$ for use in obtaining tilt raw data instead of a value obtained by interpolation calculation. In this case, even the main peak value becomes variable, and hence the induced voltage is distributed within the detection width of the sensor coil. In other words, when the stylus pen moves in the plus direction within the detection width $\Delta X_0$ of the sensor coil $C_0$, the main peak value $V_p$ detected by the sensor coil $C_0$ changes from $V_p(-1)$ at $t=t_{-1}$ to $V_p(0)$ at $t=t_0$, and further to $V_p(1)$ at $t=t_1$. This main peak value $V_p$ is indicated as "a detected main peak voltage" by a thick line in the drawing. In the same manner as previously explained for the case shown in FIG. 3, an induced voltage of a sub-peak is distributed within the detection width of the sensor coil. In other words, the sub-peak value $V_{ap}$ detected by a sensor coil $C_{-4}$ changes from $V_{ap}(-1)$ at $t=t_{-1}$ to $V_{ap}(0)$ at $t=t_0$, and further to $V_{ap}(1)$ at $t=t_1$. This sub-peak value $V_{ap}$ is indicated as "a detected sub-peak voltage" by a thick line in the drawing. In FIG. 4, if the main peak value and the sub-peak value change in the same manner within respective detection widths of the sensor coils, errors, included in the tilt raw data which are based on the ratio of the main peak value to the sub-peak value, will be substantially cancelled. In other words, the errors will be cancelled so long as the distribution curves of the induced voltages are similar in shape to each other.

However, the distribution curves of induced voltages occurring within the respective detection widths of the main peak and sub-peak values will not normally be similar to each other in shape. This is shown in FIG. 5. FIG. 5 shows each of the distribution curves of induced voltages of the detected main peak and sub-peak voltages obtained within the detection widths of the sensor coils shown in FIG. 4. The horizontal axis shown in FIG. 5 represents coordinates of a position indicated by the stylus pen. When the stylus pen moves at a constant velocity, the horizontal axis also serves as the time base. In this way, the distribution curves of induced voltages of the detected main peak and sub-peak voltages do not match in shape with each other. This is one reason for the errors included in the tilt raw data.

FIG. 6 shows distribution curves of induced voltages obtained when the tilt angle of the stylus pen in one axial direction is changed. As shown in the drawing, the greater the tilt angle becomes, the larger variations in the detected voltage within the detection width of the sub-peak become. This implies that an increase in the tilt angle of the stylus pen results in an increase in the errors included in the tilt raw data. It is apparent from FIG. 6 that the detected sub-peak voltage comes to a minimum when the tilt angle is small, particularly when the tilt angle is less than 30 degrees. This is another reason why the sub-peak value is not obtained by interpolation calculation.

FIG. 7 shows another problem arising when one sensor coil is used for detecting an induced voltage. When the position indicator moves from the detection width of one sensor coil to the detection width of another sensor coil, an induced voltage is detected by switching the sensor coil to an adjacent sensor coil. At this time, a sensor coil for detecting a main peak and a sensor coil for detecting a sub-peak are simultaneously switched. FIG. 5 shows the distribution curves of induced voltages of the sensor coils for detecting both main and sub-peaks. When the sensor coils used for detection are switched, level differences $\Delta V_p$ and $\Delta V_{ap}$ respectively arise in the main and sub-peak values.

As a result of this, as shown in FIG. 8, a level difference $\Delta D$ also arises in calculated tilt raw data. No level difference arises in the peak value when the main peak value is obtained by interpolation calculation. However, the level difference similarly arises in the tilt raw data because of a level difference occurring in the sub-peak value.

FIG. 9 is a graph of tilt angles calculated on the basis of voltages detected when the tilt angle of the stylus pen in the direction of one axis is changed. The horizontal axis in the graph represents merely a part of the coordinate axis. For simplicity, a value obtained by interpolation calculation is used as the main peak value. Originally, calculated tilt angles had to match with the actual tilt angles. Idealistically, every line of the calculated tilt angles shown in FIG. 9 must be a line indicating a constant value. However, in the graph shown in FIG. 9, the greater the tilt angle of the stylus pen actually became, the larger variations, i.e. errors, in the calculated tilt angles became. This is because the distribution of induced voltages of the sub-peak value becomes larger as the tilt angle of the stylus pen becomes greater. Further, level differences arise at the points where the sensor coils are switched. This is also attributable to the level differences of the sub-peak value occurring at the switching points.

Heretofore, the calculation of inclination was corrected by correcting tilt raw data after it had been calculated. This correction includes (1) a correction between sensor coils (within one detection width), (2) a correction for obtaining an optimum tilt angle from tilt raw data, (3) a correction allowing for a tilt angle in the direction of another coordinate axis (for example, an influence of a tilt angle in the Y-axis direction on a tilt angle in the X-axis), or the like.

However, a correction to the tilt raw data obtained as a result of calculation is not necessarily the most effective way. It would be more effective to provide an error-free voltage by correcting not the tilt raw data but the original detected voltage.

The object of the present invention is to provide a correcting method, for use in a coordinate detecting device having a tilt angle detecting function, which is intended for obtaining accurate tilt data allowing for the distribution of induced voltages within a detection width of one sensor coil.

Another object of the present invention is to provide an effective correcting method which is directly applied to a detected induced voltage.

Still another object of the present invention is to provide a correcting method which has general versatility with respect to its application to coordinate detecting devices having various specifications.

A further object of the present invention is to provide a correcting method allowing for variations in the characteristic of each sensor coil.

SUMMARY OF THE INVENTION

In the first aspect of the present invention, a coordinate detecting device including a sensor section made of a plurality of sensor coils arranged side by side in both X-axis and Y-axis directions so as to constitute a sensor plane, a position indicator housing an electromagnetic coupling means, and a coordinate detecting means for detecting at least coordinates indicated by the position indicator by detecting the distribution of induced voltages occurring in the sensor coil in the direction of each axis by means of interaction between the electromagnetic coupling means and the sensor coil, the coordinate detecting device comprises:

an induced voltage distribution converting means which converts either a main peak induced voltage distribution or a sub-peak induced voltage distribution so as to be similar to the other one, when an error arises in a predetermined function of a set of induced voltages including the main peak induced voltage and the sub-peak induced voltage because of a difference between the main peak induced voltage distribution and the sub-peak induced voltage distribution within the detection width of one sensor coil resulting from the movement of the position indicator; and an angle information detecting means for calculating a tilt angle of the position indicator in the direction of each axis by the use of a predetermined function of a set of induced voltages including a main peak induced voltage and a sub-peak induced voltage which are obtained from the one induced voltage distribution which had been converted by the induced voltage distribution converting means the other induced voltage distribution.

Here, the sub-peak induced voltage may be an induced voltage developed in a sensor coil spaced a predetermined distance apart from a sensor coil which shows the maximum induced voltage.

The induced voltage distribution converting means makes the main peak may induced voltage distribution similar to the sub-peak induced voltage distribution, and wherein the angle information detecting means uses a corrected main peak induced voltage obtained from the main peak induced voltage distribution which had been converted by the induced voltage distribution converting means.

The function may be a function of the ratio of one or a pair of sub-peak induced voltages in the X-axis direction to the corrected main peak induced voltage in the X-axis direction with respect to a tilt angle in the X-axis direction, and a function of the ratio of one or a pair of sub-peak induced voltages in the Y-axis direction to the corrected main peak induced voltage in the Y-axis direction with respect to a tilt angle in the Y-axis direction.

The function may be a function of the ratio of one or a pair of sub-peak induced voltages in the X-axis direction to the corrected main peak induced voltage in the X-axis direction and the ratio of one or a pair of sub-peak induced voltages in the Y-axis direction to the corrected main peak induced voltage in the Y-axis direction with respect to an each tilt angle in the X-axis and Y-axis direction.

The induced voltage distribution converting means may comprise a means for deducing an induced voltage distribution function using interpolation calculation, and a means for subjecting the induced voltage distribution function to a translation operation in the direction of the axis.

The induced voltage distribution function may be represented as a function of inter-sensor-coil coordinates applicable to the detection width of any of the sensor coils.

The induced voltage distribution function may be represented as a function of alternative coordinates which are the inter-sensor-coil coordinates including the translation operation.

The angle information detecting means may use parameters indicating variations in a detected value of the induced voltage for each sensor coil, and parameters indicating variations in the ratio of the sub-peak value to the corrected main peak value for the detection width of each sensor coil.

The angle information detecting means may use parameters indicating variations in the ratio of the sub-peak value of each sub-divisions to the corrected main peak value when the detection width of the sensor coil is divided into a plurality of sub-divisions.

In the second of the present invention, an angle information detecting method for use in a coordinate detecting device including a sensor section made of a plurality of sensor coils arranged side by side in both X-axis and Y-axis directions so as to constitute a sensor plane, a position indicator housing an electromagnetic coupling means, and a coordinate detecting means for detecting at least coordinates indicated by the position indicator by detecting the distribution of induced voltages occurring in the sensor coil in the direction of each axis by means of interaction between the electromagnetic coupling means and the sensor coil, the angle information detecting method comprises:

an induced voltage distribution converting step for converting either a main peak induced voltage distribution or a sub-peak induced voltage distribution so as to be similar to the other one, when an error arises in a predetermined function of a set of induced voltages including the main peak induced voltage and the sub-peak induced voltage because of a difference between the main peak induced voltage distribution and the sub-peak induced voltage distribution within the detection width of one sensor coil resulting from the movement of the position indicator; and an angle information detecting step for calculating a tilt angle of the position indicator in the direction of each axis by the use of a predetermined function of a set of induced voltages including a main peak induced voltage and a sub-peak induced voltage which are obtained from the one induced voltage distribution which had been converted by the induced voltage distribution converting means and the other induced voltage distribution.

Here, the sub-peak induced voltage may be an induced voltage developed in a sensor coil spaced a predetermined distance apart from a sensor coil which shows the maximum induced voltage.

The induced voltage distribution converting step may be to make the main peak induced voltage distribution similar to the sub-peak induced voltage distribution, and the angle information detecting step may use a corrected main peak induced voltage acquired from the main peak induced voltage distribution which had been converted by the induced voltage distribution converting means.

The function may be a function of the ratio of one or a pair of sub-peak induced voltages in the X-axis direction to the corrected main peak induced voltage in the X-axis direction with respect to a tilt angle in the X-axis direction, and a function of the ratio of one or a pair of sub-peak induced voltages in the Y-axis direction to the corrected main peak induced voltage in the Y-axis direction with respect to a tilt angle in the Y-axis direction.

The function may be a function of the ratio of one or a pair of sub-peak induced voltages in the X-axis direction to the corrected main peak induced voltage in the X-axis direction and a function of the ratio of one or a pair of sub-peak induced voltages in the Y-axis direction to the corrected main peak induced voltage in the Y-axis direction with respect to an each tilt angle in the X-axis and Y-axis direction.

The induced voltage distribution converting step may comprise a step for deducing an induced voltage distribution function using interpolation calculation, and a step for subjecting the induced voltage distribution function to a translation operation in the direction of the axis.

The induced voltage distribution function may be represented as a function of inter-sensor-coil coordinates applicable to the detection width of any of the sensor coils.

The induced voltage distribution function may be represented as a function of alternative coordinates which are the inter-sensor-coil coordinates including the translation operation.

The angle information detecting means may use parameters indicating variations in a detected value of the induced voltage for each sensor coil, and parameters indicating variations in the ratio of the sub-peak value to the corrected main peak value for the detection width of each sensor coil.

The angle information detecting steps may use parameters indicating variations in the ratio of the sub-peak value of each sub-division to the corrected main peak value when the detection width of the sensor coil is divided into a plurality of sub-divisions.

In one preferred embodiment, induced voltages are respectively obtained from the distribution of main peak induced voltages and the distribution of sub-peak induced voltages after both distribution curves have been rendered similar to each other by the induced voltage distribution converter means, and the thus obtained induced voltages are used, as the main peak induced voltage and the sub-peak induced voltage, in calculation of the angle information detecting means of the coordinate detecting device. As a result of the conversion of the distribution curves, the ratio of the main peak induced voltage to the sub-peak induced voltage becomes constant at any specific point on the distribution curves. Hence, it is possible to cancel errors, caused by a difference between the distribution curves of the induced voltages within the detection width of one sensor coil, by a calculation using a function including the above mentioned ratio.

In another preferred embodiment, the distribution of main peak induced voltages is made similar to the distribution of sub-peak induced voltages. This converting operation is based on the precondition that interpolation calculation is used for calculating an induced voltage distribution curve, and that interpolation calculation is originally executed for calculating a coordinate with respect to the main peak induced voltage. It is more effective to make a correction not to the sub-peak induced voltage distribution but to the main-peak induced voltage distribution, because the same interpolation calculation can be utilized for two purposes. The use of a raw induced voltage as a sub-peak value, obtained from one predetermined sensor coil without interpolation calculation, allows fast calculation.

It is known that a tilt angle of the stylus pen is represented by a function of the main peak induced voltage and the sub-peak induced voltage. However, the main peak and sub-peak induced voltages vary according to a distance between the stylus pen and the coordinate input plane or a pressing force. Hence, it is effective to handle the sub-peak induced voltage as a so-called normalized voltage by calculating the ratio of the main peak induced voltage to the sub-peak induced voltage.

Specifically, a sub-peak induced voltage for a tilt angle in the X-axis direction is normalized by calculating the ratio of the sub-peak induced voltage in the X-axis direction to a corrected main peak induced voltage in the X-axis direction, and a sub-peak induced voltage for a tilt angle in the Y-axis direction is normalized by calculating the ratio of the sub-peak induced voltage in the Y-axis direction to a corrected main peak induced voltage in the Y-axis direction. It is possible to calculate a tilt angle in the direction of each axis by means of a function of these normalized voltages.

The pattern of the induced voltage distribution function is corrected by interpolation calculation during the conversion of the induced voltage distribution function. This correction is a longitudinal direction type correction. The correction is carried out in such a way that the patterns of the induced voltage distribution functions are made similar to each other during a detection width of one particular sensor coil as a result of the translation operation. This correction is a lateral direction type correction.

In this way, the present invention provides means and a method for use in a coordinate input device which are intended for detecting accurate angle information.

As can be seen from embodiments of the present invention which will be described later, in an embodiment wherein an error, caused by a distribution of induced voltages within a detection width of a sensor coil resulting from the acquisition of a sub-peak value from only one sensor coil, is eliminated, the error is eliminated by rendering a distribution function of a main peak induced voltage similar to a distribution function of a sub-peak induced voltage. Since an actually detected main peak voltage is corrected in the present invention, this correction is more effective compared with a conventional correction made to any calculated values. Therefore, a tilt angle without an error in the distribution of induced voltages is calculated between sensor coils for any tilt angle.

Moreover, since the coordinates or the alternative coordinates of a sensor coil are used instead of the absolute coordinates thereof when a distribution function of induced voltages is handled within the detection width of one sensor coil, the correcting method according to the present invention has general versatility to coordinate detecting devices with several specifications which have different voltage detecting characteristics.

Further, according to the present invention, calculations allowing for errors caused by a tilt angle of the stylus pen in the direction of an axis orthogonal to the direction of a predetermined axis are feasible during the calculation of a tilt angle in the predetermined axis direction after errors in a distribution of induced voltages within a detection width of a sensor coil have been eliminated. Hence, a more accurate tilt angle in that predetermined direction can be obtained.

In addition, since variations in the characteristics of each sensor coil or the characteristics of one sensor coil (within a detection width of one sensor coil) can be introduced as parameters into the calculation of a tilt angle, a more accurate tilt angle can be obtained.

BRIEF DESCRIPTION OF THE DRAWINGS

FIG. 3 is a schematic representation showing a distribution curve of induced voltages when a main peak value is obtained by interpolation calculation.

FIG. 4 is a schematic representation showing a distribution curve of induced voltages when the main peak value is not obtained by interpolation calculation.

FIGS. 10A and 10B are explanatory views for illustrating steps for correcting a main peak value according to the present invention.

FIG. 11 is a graph showing a distribution function for a main peak induced voltage and a distribution function for a sub-peak induced voltage, according to the present invention, after they have been corrected.

DESCRIPTION OF THE PREFERRED EMBODIMENTS

Figure 1:
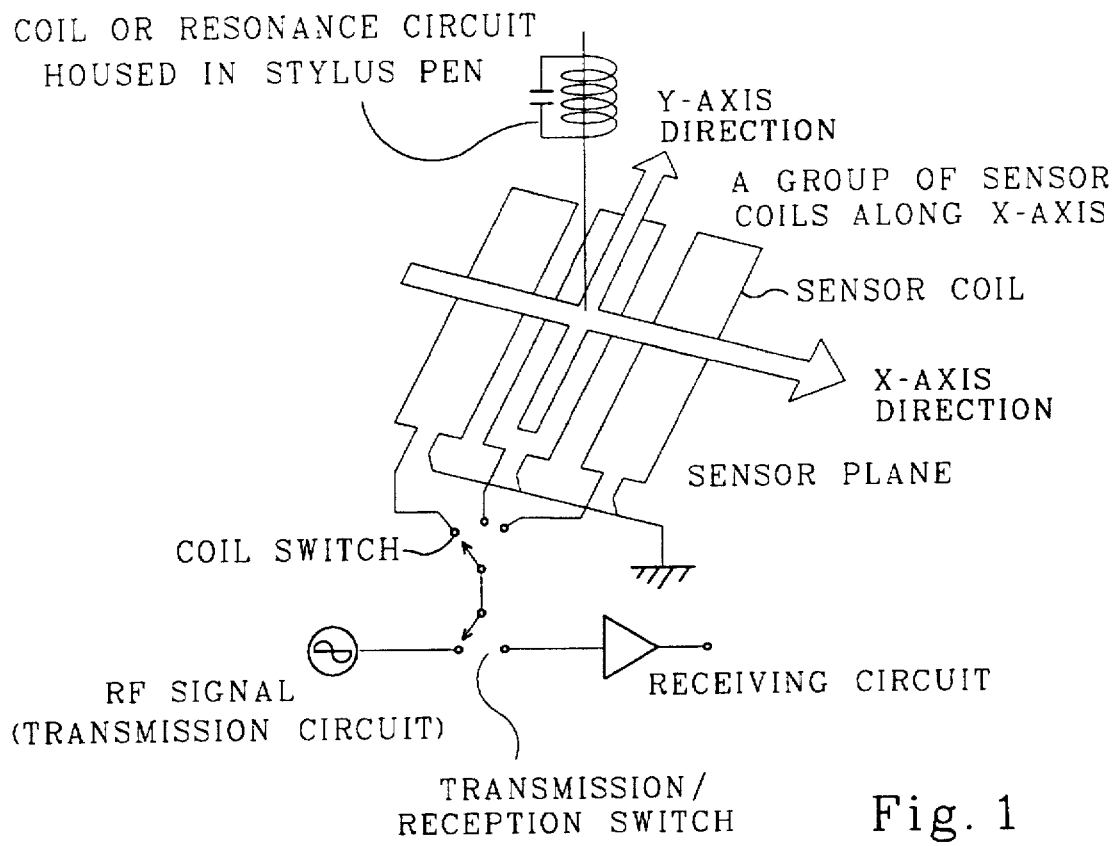
FIG. 1 is a schematic representation for illustrating the principal operation of a coordinate detecting device using a general electromagnetic transfer method.

With reference to the accompanying drawings, preferred embodiments of the present invention will be described in detail below.

As previously mentioned, the distributions of sub-peak induced voltages necessarily arise within a detection width of one sensor coil when a value detected by that sensor coil is used as a sub-peak value for use in calculating a tilt angle. This means that tilt raw data will include errors. An effective method of eliminating the errors included in the tilt raw data, is to make the characteristics of the sub-peak induced voltage distribution and the main peak induced voltage distribution, both of which arise in the detection width of one sensor coil, match each other. This is because the tilt raw data are based on the ratio of the sub-peak value to the main peak value, and hence variations in the sub-peak and main peak values are substantially cancelled when variation characteristics of the sub-peak and main peak values match each other.

To realize this cancellation of variations, a correction is made in such a way that the induced voltage distribution characteristics, i.e., an induced voltage distribution function of either of the peak values are converted so as to become similar to an induced voltage distribution function of the other peak value. To be more specific, an induced voltage distribution function of one peak value is first obtained by the use of appropriate interpolation, whereby the thus obtained induced voltage distribution function is provided with the characteristics which are the same, with respect to voltage (the vertical axis), as those of the other induced voltage distribution function. The induced voltage distribution function is then subjected to a translation operation only through a predetermined distance along the horizontal axis (coordinates) so as to be endowed with the same variation characteristics within the detection width. A new main peak value or a sub-peak value obtained from the thus newly converted induced voltage distribution function is used in the calculation of tilt raw data.

The present invention is based on the assumption that only one data item is acquired from the sub-peak, and hence the correction is made using the main peak from which a plurality of data items are obtained for the calculation of coordinates. In other words, the main peak induced voltage distribution function is corrected so as to be similar to the sub-peak induced voltage distribution function, whereby a newly corrected main peak value is obtained. Even if no calculation of a tilt angle is carried out with respect to the main peak, interpolation calculation must be executed for the main peak in order to calculate a correct coordinate. Hence, the interpolation calculation for the main peak will not cause an additional burden on the processing section.

A main peak value correcting method for use in the calculation of a tilt angle, according to the present invention, will be described in more detail with reference to FIGS. 10 and 11. For simplicity of explanation, only the correction of a tilt angle in the X-axis will be described, but this explanation applies equally to the correction of a tilt angle in the Y-axis. FIGS. 10A and 10B are diagrams for illustrating procedures of a decision regarding appropriate correction of main peak data. To begin with, simulation similar to that carried out to obtain the induced voltage distribution curves shown in FIGS. 3 and 4 is executed. A solid line in FIG. 10A represents a main peak induced voltage distribution curve obtained using interpolation calculation to obtain the main peak value $V_p$ and an indicated coordinate $x_p$. The indicated coordinate $x_p$ is within a range (one detection width) of the absolute coordinate x=5 to 11 (mm). FIG. 10B shows a sub-peak induced voltage distribution curve within the detection width of a sub-peak detecting sensor coil obtained at the same point in time as FIG. 10A. The object of this correction is to make the main peak induced voltage distribution curve (i.e., an induced voltage distribution function) similar in shape to the sub-peak induced voltage distribution curve. In the case of this embodiment, interpolation is calculated for four points to obtain $V_p$ and $x_p$. This four-point interpolation has been chosen, because a pattern obtained by the four-point interpolation is more similar to the sub-peak induced voltage distribution curve when compared with a pattern obtained by other interpolation methods (for example, a three-point interpolation).

It is effective to use a coordinate "s" between sensor coils instead of the absolute coordinate "x". In other words, if the interval between sensor coils which equals one detection width is replaced with the inter-sensor-coil coordinate "s" ($-0.5 \leq s \leq 0.5$), the same induced voltage distribution function V(s) can be used for all of the intervals between sensor coils (or detection widths). The advantage of using such an inter-sensor-coil coordinate "s" is that the same induced voltage distribution function and the same processes of tilt calculation can be applied to coordinate detecting systems having various different specifications such as intervals between sensor coils. In this embodiment, assuming that an interval between sensor coils where the main peak value appears is an absolute coordinate x=5 to 11 (mm), an expression for converting x to s becomes $$x = 6s + 8.$$

The induced voltage distribution function V(s) used in the four-point interpolation will be expressed as follows.

Suppose voltages detected for the main peak from four points, namely, V(−1.5), V(−0.5), V(0.5), and V(1.5) are expressed as α, β, γ, and δ, respectively. We have $$V(s) = V_+(s) \quad (0 \leq s \leq 0.5) \tag{1}$$

$$V(s) = V_-(s) \quad (-0.5 \leq s \leq 0) \tag{2}$$

where $$V_+(s) = \tfrac{1}{16}\{(\alpha + 11\beta + 3\gamma + \delta) + 4(\alpha - 3\beta + \gamma + \delta)s + 4(\alpha - \beta - \gamma + \delta)s^2\} \tag{3}$$

$$V_-(s) = \tfrac{1}{16}\{(\alpha + 11\beta + 3\gamma + \delta) - 4(\alpha - 3\beta + \gamma + \delta)s + 4(\alpha - \beta - \gamma + \delta)s^2\} \tag{4}$$

The expression (1) (that is, the expression (3)) represents a curve on the right side with respect to the peak of the induced voltage distribution function, whereas the expression (2) (that is, the expression (4)) represents a curve on the left side with respect to the peak of the same. V(s) is determined from the four detected voltages by virtue of these expressions, and V at arbitrary coordinates can be calculated.

A coordinate "$s_p$" between the sensor coils where the main peak value $V_p$ appears is expressed as follows:

$$S_p = (-\alpha - \beta + \gamma + \delta)/\{2(-\alpha + \beta + \gamma - \delta)\} \tag{5}$$

In the present invention, the main peak induced voltage distribution curve shown by the solid line in FIG. 10A is subjected to a translation operation through only a relative coordinate "a" in the direction of the axis so as to match with the sub-peak induced voltage distribution curve shown in FIG. 10B. As a result, an induced voltage distribution curve as shown by a broken line is obtained. An induced voltage distribution function which shows the induced voltage distribution curve of the broken line is V(s+a). If u=s+a is used as an alternative coordinate, then $$V(u) = V(s+a) \tag{6}$$

The function V(u) matches, in shape, the sub-peak induced voltage distribution function within one interval of the sensor coils. This is shown in FIG. 11. The inter-sensor-coil indicated coordinate "$s_p$" is calculated from the expression (5). The true main peak value $V_p$ is V($s_p$). However, assuming that the main peak value obtained after correction, that is, the main peak value to be used for the calculation of tilt raw data is $V_p'$, $$V_p' = V_p(s+a) \tag{7}$$

As previously mentioned, the interpolation (that is, the induced voltage distribution function) and the coordinate translation value "a" are previously determined. These are independent of a tilt angle and thus applicable to any tilt angle. Thereafter, position detecting processes are practically executed. Four detected voltages (that is, α, β, γ, and δ) are acquired from a group of main peak detection sensor coils by means of sector scan. The main peak induced voltage distribution function V(s) and the inter-sensor-coil coordinate "$s_p$" are obtained by substituting these detected voltages into the expressions (3), (4), and (5) (the indicated coordinate "$x_p$" is calculated by the expression for converting the absolute value to the inter-sensor-coil coordinate). Subsequently, the corrected main peak value $V_p'$ is obtained by calculating V($s_p$+a).

Figure 12:
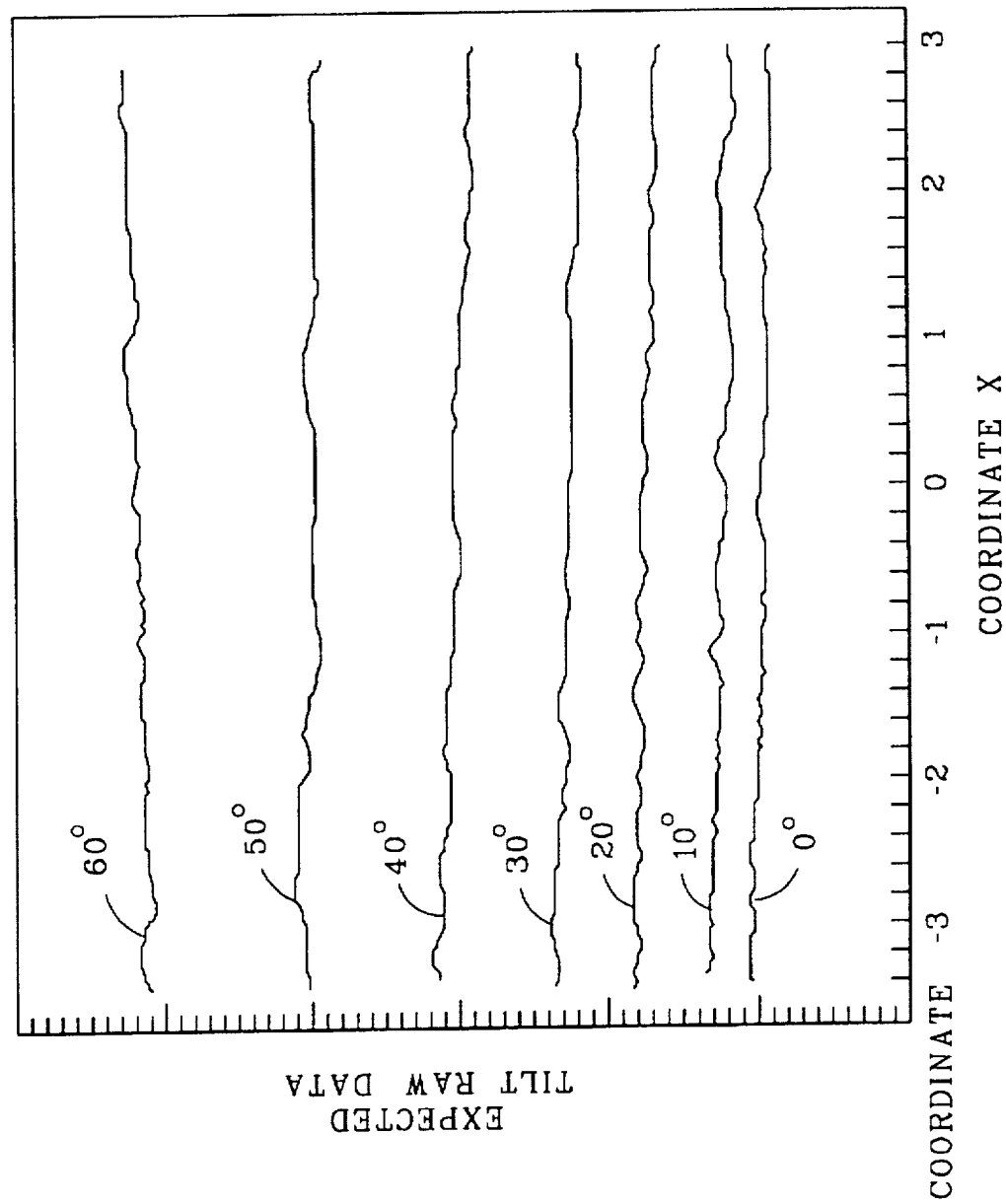
FIG. 12 is a graph showing expected tilt raw data for each of tilt angles within a detection width of a sensor coil after the main peak value has been corrected and FIG. 13 is a flow chart showing steps of calculation of a tilt angle according to the present invention.

Ratios $V_{pa}/V_p'$ and $V_{pb}/V_p'$ used for obtaining tilt raw data are calculated using the corrected main peak value $V_p'$ and the detected sub-peak values $V_{pa}$ and $V_{pb}$, and the calculation of inclination is initiated. FIG. 12 is a graph showing expected tilt raw data for each tilt angle after the correction of the main peak value within the detection width. It can be seen from the drawing that substantially constant tilt raw data are obtained for every tilt angle.

Figure 2:
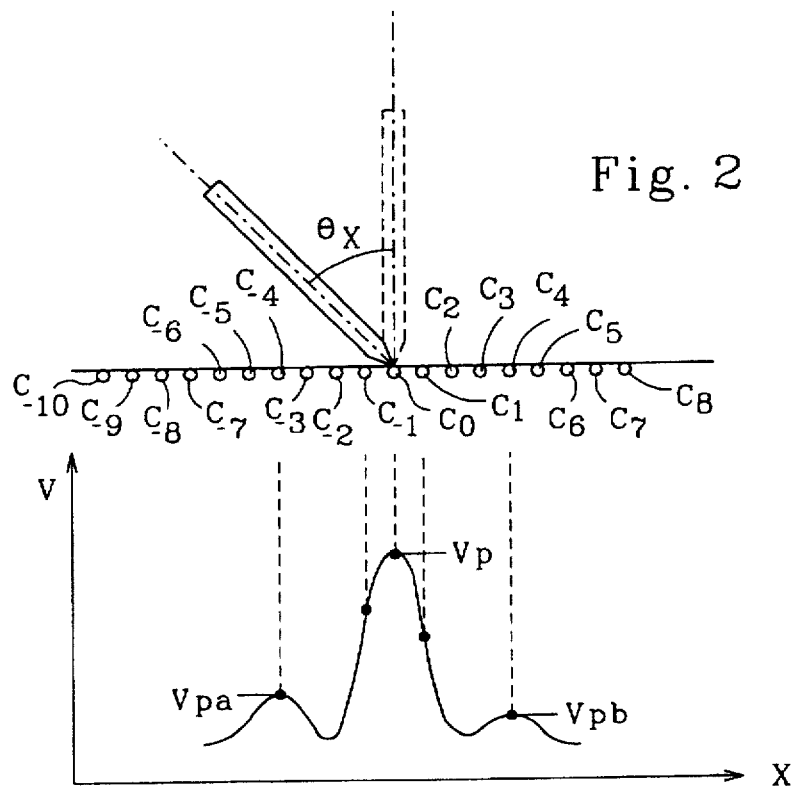
FIG. 2 is a schematic representation showing an example of a distribution curve of induced voltages.
Figure 5:
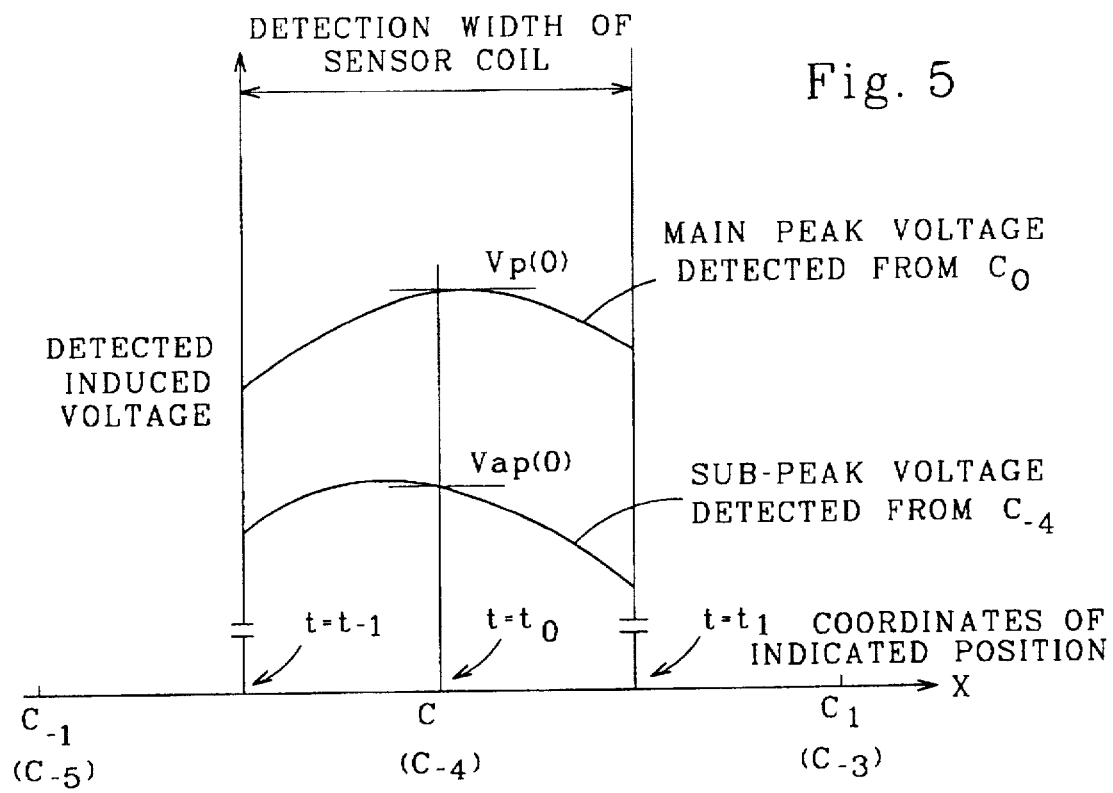
FIG. 5 is a graph showing voltage distribution curves of main peak and sub-peak voltages, respectively, within a detection width of a sensor coil in the case shown in FIG. 4.
Figure 6:
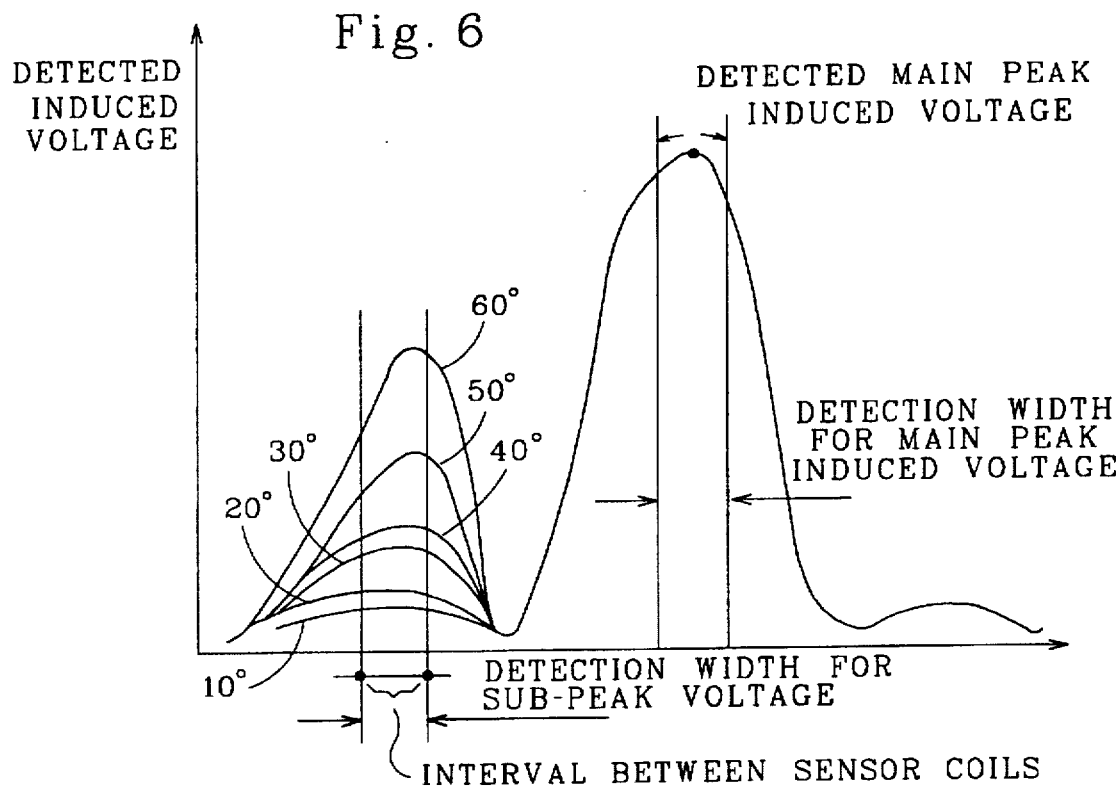
FIG. 6 is a graph showing distribution curves of induced voltages detected when a tilt angle of a stylus pen relative to one axial direction is changed.
Figure 7:
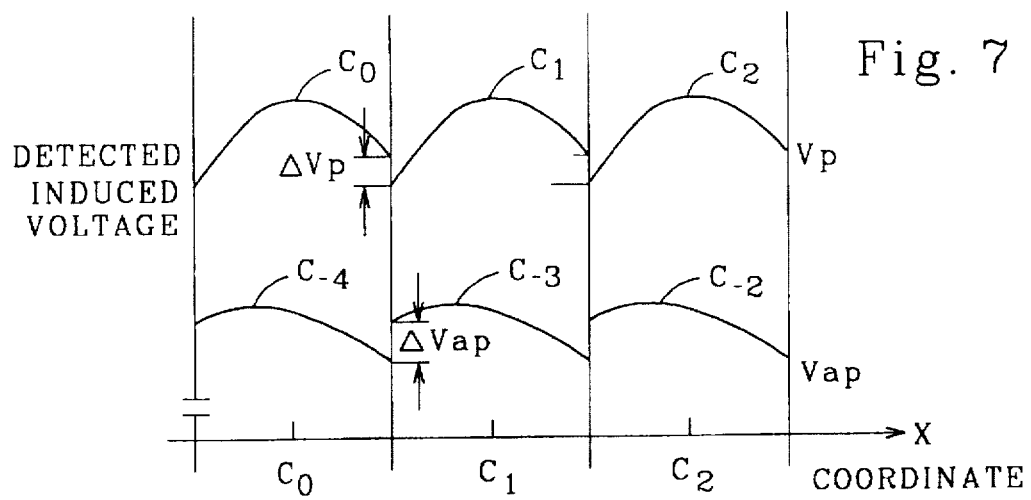
FIG. 7 is a graph showing another problem arising when one sensor coil is used for detecting an induced voltage.
Figure 8:
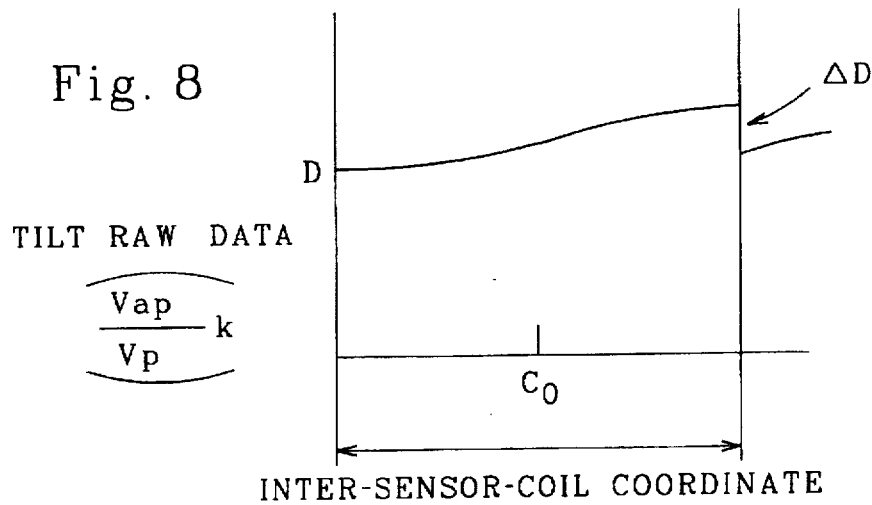
FIG. 8 is a graph showing tilt raw data calculated based on the detected induced voltages shown in FIG. 7.
Figure 9:
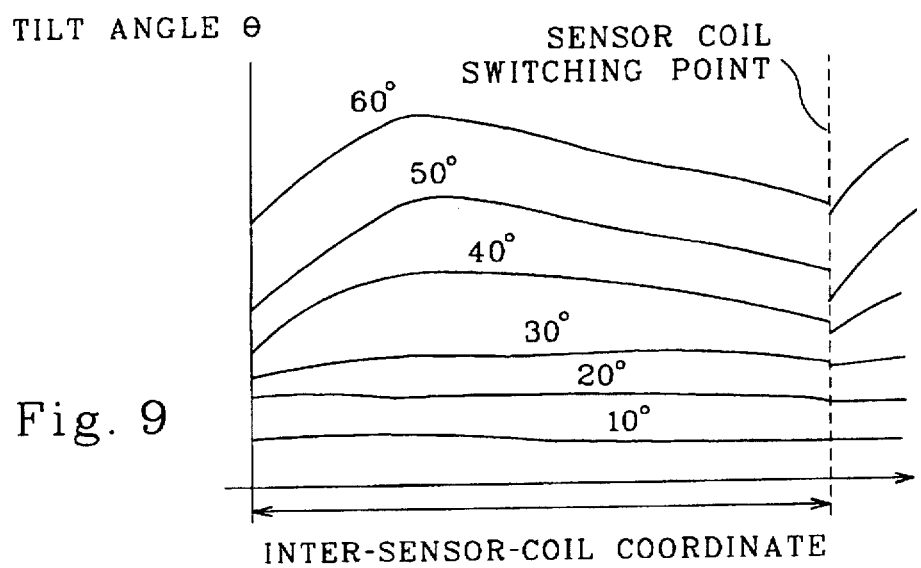
FIG. 9 is a graph showing tilt angles calculated based on voltages detected when the tilt angle of the stylus pen in one axial direction is changed.

The processes of tilt calculation will be initially described in detail. Where a substantially vertical stylus pen is inclined in the X-axis direction in FIG. 2, as the tilt angle $\theta_x$ in the X-axis direction becomes greater, the sub-peak voltage $V_{pa}$ in the direction in which the stylus pen is inclined becomes greater, but the sub-peak voltage $V_{pb}$ in the opposite direction to the direction of the inclination of the stylus pen becomes smaller. Hence, unless the stylus pen has a tilt angle in the Y-axis direction, it will always be possible to calculate a tilt angle in the X-axis from the ratio of the sub-peak voltage to the main peak voltage along the X-axis. One reason for the use of the ratio is the possibility of variations in either of the peak voltages due to factors other than the tilt angle. The other factors include, for example, the height of the stylus pen with respect to the sensor coils, the presence or absence of a pen-down action, and the magnitude of a pressing force of the stylus pen. However, if the stylus pen is inclined in the Y-axis direction, the use of only the sub-peak/main peak voltage ratio along the X-axis cannot prevent errors. For example, if a substantially vertical stylus pen is inclined in only the Y-axis direction, the magnitudes of the sub-peak voltages $V_{ap}$ and $V_{bp}$ along the X-axis will be substantially equal to each other irrespective of the tilt angle $\theta_y$ in the Y-axis direction. However, the ratios of the sub-peak values $V_{ap}$ and $V_{bp}$ to the main peak voltage $V_p$ (that is, the ratios $V_{ap}/V_p$ and $V_{bp}/V_p$) increase as the tilt angle $\theta_y$ becomes greater. In other words, the tilt angle in the X-axis is calculated irrespective of an tilt angle of 0 degree in the X-axis direction because of variations in the sub-peak/main peak voltage ratios along the X-axis. This is because substantial variations in the height of the stylus pen from the sensor plane consisting of the coils when the pen is inclined.

Therefore, when the tilt angle $\theta_x$ in the X-axis direction is generally obtained, it is necessary to consider both the sub-peak/main peak ratio along the X-axis and the sub-peak/main peak ratio along the Y-axis. Assume that the main peak voltage (the value corrected by the previously mentioned method) and both sub-peak voltages along the X-axis are $V_{px}'$, $V_{apx}$, and $V_{bpx}$ and that the main peak voltage (the value similarly corrected by the previously mentioned method) and both sub-peak voltages are $V_{py}'$, $V_{apy}$, and $V_{bpy}$. Moreover, assume also that the ratios of the sub-peak voltage to the main peak voltage are normalized voltages $v_{apx}$, $v_{bpx}$, $v_{apy}$, and $v_{bpy}$. Specifically, $$v_{apx} = V_{apx}/V_{px}' \tag{8}$$

$$V_{bpx} = V_{bpx}/V_{px}' \quad (9)$$

$$V_{apy} = V_{apy}/V_{py}' \quad (10)$$

$$V_{bpy} = V_{bpy}/V_{py}' \quad (11)$$

As mentioned above, these are tilt raw data which are calculated by the use of the main peak value allowing for the induced voltage distribution within the detection width of the sensor coil (or the tilt raw data may often be obtained by multiplying the tilt raw data by a constant "k").

Steps for calculating the tilt angle $\theta_x$ in the X-axis direction from these four normalized voltages will be as follows:

$$\kappa x = V_{apy} - V_{bpy} \quad (12)$$

$$\lambda x = V_{apx} - V_{bpx} \quad (13)$$

$$\mu x = A - B \cdot \kappa x^2 - C \cdot \lambda x^2 (A, B, C = \text{constants}) \quad (14)$$

$$V_{apx}' = V_{apx} + \mu x \cdot \lambda x \quad (15)$$

$$V_{bpx}' = V_{bpx} - \mu x \cdot \lambda x \quad (16)$$

$$V_{xt} = (V_{apx}' \cdot V_{bpx}')/(V_{apx}' + V_{bpx}') \quad (17)$$

A, B and C in the expression 14 are predetermined constants. $\lambda x$ in the expression (13) is an interpolation distance within the interval between sensor coils. For example, if the interval between sensor coils is 6 mm, the interpolation distance will be $-3 \text{ mm} \leq \lambda x \leq 3 \text{ mm}$.

The $v_{xt}$ is tilt raw data in the X-axis direction which is finally obtained as a result of the tilt calculation. The tilt angle $\theta_x$ can be derived from the $v_{xt}$ by having previously obtained the relationship between the inclined data $v_{xt}$ and the tilt angle $\theta_x$. On the other hand, the tilt data $v_{yt}$ in the Y-axis direction is calculated in the same manner. The tilt angle $\theta_y$ can be derived from the $v_{yt}$ by having previously obtained the relationship between the tilt data $v_{yt}$ and the tilt angle $\theta_y$.

In this way, the relationship between the previously obtained $v_{xt}$ and the tilt angle $\theta_x$, and the relationship between $v_{yt}$ and the tilt angle $\theta_y$ are stored as tables into a storage device such as a memory. It is also possible to constitute the system such that the tilt angles $\theta_x$ and $\theta_y$ respectively corresponding to the calculated $v_{xt}$ and $v_{yt}$ are fetched from the tables.

Figure 13:
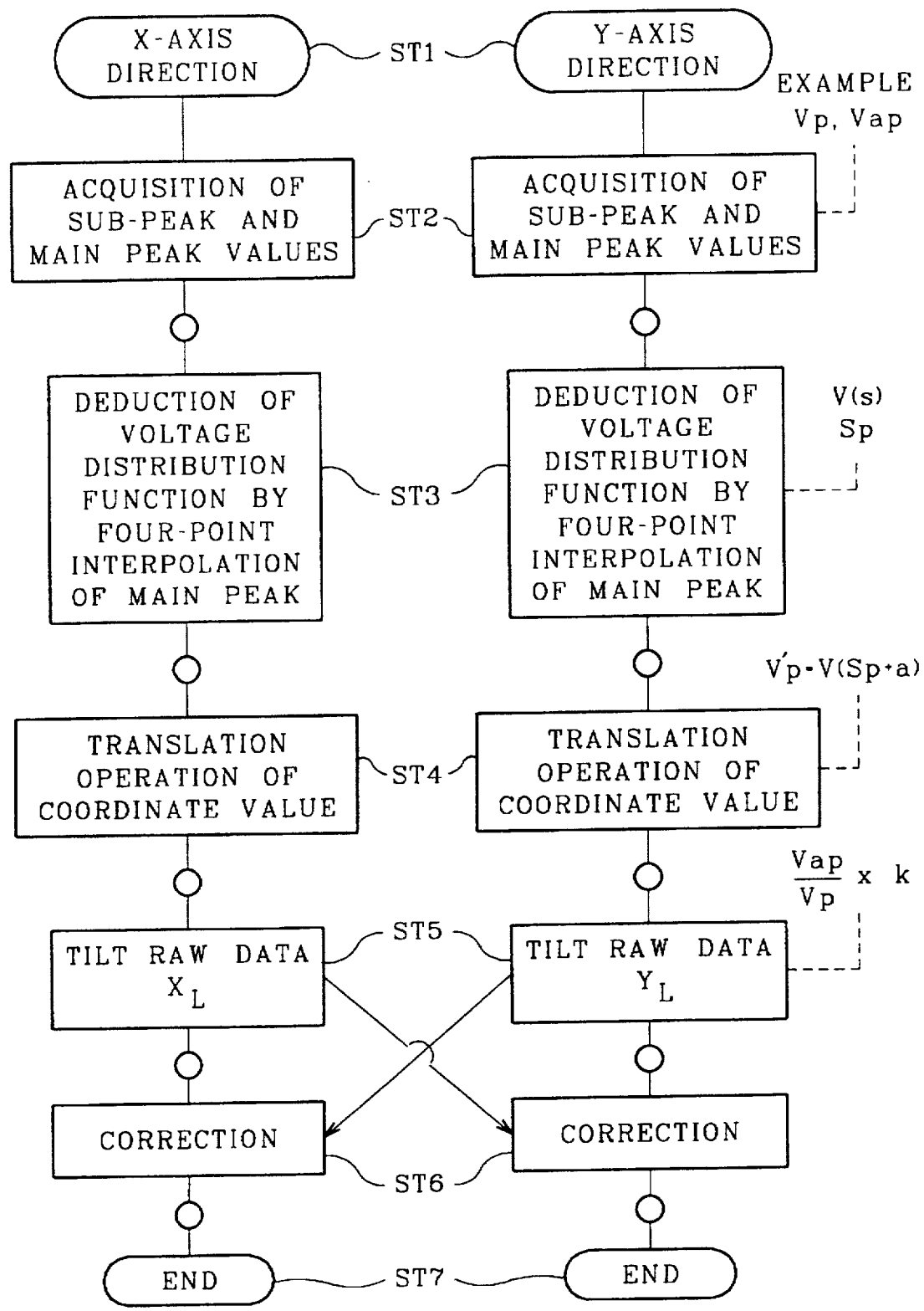

FIG. 13 is a flow chart showing procedures of tilt calculation according to the present invention. Exemplified variables or functions represent variables or functions detected or calculated in steps ST1 to ST7 (for simplicity, these variables or functions are only for one sub-peak value). Sector scan is started in step ST1, and the main peak detected value $V_p$ and the sub-peak detected value $V_{ap}$ are acquired in step ST2. Interpolation calculation is executed using voltages detected from four points in the vicinity of the maximum main peak value in step ST3. In effect, the main peak induced voltage distribution function V(s) and the coordinate "$s_p$" are obtained by substituting the voltages detected from the four points into coefficients of the previously-obtained main peak induced voltage distribution function and coordinates. The main peak induced voltage distribution function is subjected to a translation operation using only the translation operation value "a" previously obtained in the direction of the axis in step ST4, whereby the corrected main peak induced voltage distribution function V(s+a) is obtained. The corrected main peak $V_p'$ is obtained by substituting the coordinate "$s_p$" into the corrected main peak induced voltage distribution function V(s+a). Each item of tilt raw data is calculated using the corrected main peak value $V_p'$ in step ST5. In step 6, correction is made to obtain the tilt angle $\theta$ utilizing the tilt raw data calculated in step ST5. In step 6, tilt raw data of the Y-axis are referred to with respect to the X-axis direction, and tilt raw data of the X-axis are referred to with respect to the Y-axis direction in order to correct variations in the height of the coils caused by the inclination of the stylus pen. In this way, calculation results with respect to the axes which cross at right angles are also taken into account during the calculation of a tilt angle. Then, tilt data are obtained in step ST7.

Tilt angles can be calculated through these calculation steps, taking into consideration induced voltage distributions within the detection width of the sensor coil and tilt angles in the directions of the axes.

However, in practice, induced voltage distributions within the detection width are not the same but variable for each detection width of each sensor coil, and these variations result in errors. Every type of product has its own error.

For this reason, when more accurate tilt angles are desired by taking into consideration errors due to variations in each detection width of each sensor coil, additional correction tables are provided. For instance, values allowing for errors have previously been obtained for the detection width of each sensor coil, and these values are provided as a first correction table. Values for which the first correction table is provided are, for example, the parameters A, B, and C in the expression (14). Specifically, the calculation of tilt angles is executed by fetching the appropriate parameters A, B and/or C from the first correction table for each of the detection widths of the sensor coils.

It is also possible to provide this first correction table to the inter-sensor-coil coordinate of the expression (5), the corrected main peak value $V_p'$ of the expression (7), and tilt raw data of the expressions (8) to (11).

The first correction table may be prepared for each of square matrix regions defined by the sensor coils arranged in the X-axis direction and the sensor coils arranged in the Y-axis direction.

In some case, a second correction table may be provided to each of sub-regions made by equally dividing the detection width of one sensor coil into a plurality of pieces. Values allowing for variations in characteristics for each sub-region are previously obtained with respect to the parameters A, B, and C. The values are arranged into the second correction table. Particularly, this correction table is useful for a large induced voltage distribution within the detection width of one sensor coil.

In this way, if the tilt angle $\theta_x$ in the X-axis direction and the tilt angle $\theta_y$ in the Y-axis direction are obtained, directions of the tilt angles of the stylus pen and the tilt angles $\theta$ in the directions of tilt angles can be calculated using the previously mentioned tilt angles. Such a calculation method is already known.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A coordinate detecting device including a sensor section made of a plurality of sensor coils arranged side by side in both X-axis and Y-axis directions so as to constitute a sensor plane, a position indicator housing an electromagnetic coupling means, and a coordinate detecting means for detecting at least coordinates indicated by the position indicator by detecting the distribution of induced voltages occurring in the sensor coil in the direction of each axis by means of interaction between the electromagnetic coupling means and the sensor coil, the coordinate detecting device comprising:

an induced voltage distribution converting means for converting one of a main peak induced voltage distribution and a sub-peak induced voltage distribution so as to be similar to the other one when an error arises in a predetermined function of a set of induced voltages including the main peak induced voltage and the sub-peak induced voltage because of a difference between the main peak induced voltage distribution and the sub-peak induced voltage distribution within the detection width of one sensor coil resulting from the movement of the position indicator; and an angle information detecting means for calculating a tilt angle of the position indicator in the direction of each axis by the use of a predetermined function of a set of induced voltages including a main peak induced voltage and a sub-peak induced voltage which are obtained from (i) said one induced voltage distribution which had been converted by the induced voltage distribution converting means, and (ii) the other induced voltage distribution.

2. The coordinate detecting device according to claim 1, wherein the sub-peak induced voltage is an induced voltage developed in a sensor coil spaced a predetermined distance apart from a sensor coil which shows the maximum induced voltage corresponding to the main peak induced voltage.

3. The coordinate detecting device according to claim 2, wherein the induced voltage distribution converting means makes the main peak induced voltage distribution similar to the sub-peak induced voltage distribution, and wherein the angle information detecting means uses a corrected main peak induced voltage obtained from the main peak induced voltage distribution which had been converted by the induced voltage distribution converting means.

4. The coordinate detecting device according to claim 3, wherein the function is a function of the ratio of one or a pair of sub-peak induced voltages in the X-axis direction to the corrected main peak induced voltage in the X-axis direction with respect to a tilt angle in the X-axis direction, and a function of the ratio of one or a pair of sub-peak induced voltages in the Y-axis direction to the corrected main peak induced voltage in the Y-axis direction with respect to a tilt angle in the Y-axis direction.

5. The coordinate detecting device according to claim 3, wherein the function is a function of the ratio of one or a pair of sub-peak induced voltages in the X-axis direction to the corrected main peak induced voltage in the X-axis direction and the ratio of one or a pair of sub-peak induced voltages in the Y-axis direction to the corrected main peak induced voltage in the Y-axis direction with respect to an each tilt angle in the X-axis and Y-axis direction.

6. The coordinate detecting device according to claim 3, wherein the angle information detecting means uses parameters indicating variations in a detected value of the induced voltage for each sensor coil, and parameters indicating variations in the ratio of the sub-peak value to the corrected main peak value for the detection width of each sensor coil.

7. The coordinate detecting device according to claim 3, wherein the angle information detecting means uses parameters indicating variations in the ratio of the sub-peak value of each sub-divisions to the corrected main peak value when the detection width of the sensor coil is divided into a plurality of sub-divisions.

8. The coordinate detecting device according to claim 1, wherein the induced voltage distribution converting means comprises a means for deducing an induced voltage distribution function using interpolation calculation, and a means for subjecting the induced voltage distribution function to a translation operation in the direction of the axis.

9. The coordinate detecting device according to claim 8, wherein the induced voltage distribution function is represented as a function of inter-sensor-coil coordinates applicable to the detection width of any of the sensor coils.

10. The coordinate detecting device according to claim 9, wherein the induced voltage distribution function is represented as a function of alternative coordinates which are the inter-sensor-coil coordinates including the translation operation.

11. An angle information detecting method for use in a coordinate detecting device including a sensor section made of a plurality of sensor coils arranged side by side in both X-axis and Y-axis directions, a position indicator housing an electromagnetic coupling means, and a coordinate detecting means for detecting a least coordinates indicated by the position indicator by detecting the distribution of induced voltages occurring in sensor coils, in the direction of each of said axis directions by means of interaction between the electromagnetic coupling means and the sensor coils, the angle information detecting method comprising the steps of:

an induced voltage distribution converting step converting one of a main peak induced voltage distribution and a sub-peak induced voltage distribution so as to be similar to the other one when an error arises in a predetermined function of a set of induced voltages including the main peak induced voltage and the sub-peak induced voltage because of a difference between the main peak induced voltage distribution and the sub-peak induced voltage distribution resulting from movement of the position indicator; and an angle information detecting step calculating a tilt angle of the position indicator in the direction of each said axis by using a predetermined function of a set of induced voltages including a main peak induced voltage and a sub-peak induced voltage which are obtained from the one induced voltage distribution which had been converted in the induced voltage distribution converting step and the other induced voltage distribution.

12. The angle information detecting method according to claim 11, wherein the sub-peak induced voltage is an induced voltage developed in a sensor coil spaced a predetermined distance apart from a sensor coil which shows the maximum induced voltage.

13. The angle information detecting method according to claim 12, wherein the induced voltage distribution converting step makes the main peak induced voltage distribution similar to the sub-peak induced voltage distribution, and wherein the angle information detecting step uses a corrected main peak induced voltage acquired from the main peak induced voltage distribution which had been converted in the induced voltage distribution converting step.

14. The angle information detecting method according to claim 13, wherein the function is a function of the ratio of one or a pair of sub-peak induced voltages in the X-axis direction to the corrected main peak induced voltage in the X-axis direction with respect to a tilt angle in the X-axis direction, and a function of the ratio of one or a pair of sub-peak induced voltages in the Y-axis direction to the corrected main peak induced voltage in the Y-axis direction with respect to a tilt angle in the Y-axis direction.

15. The angle information detecting method according to claim 13, wherein the function is a function of the ratio of one or a pair of sub-peak induced voltages in the X-axis direction to the corrected main peak induced voltage in the X-axis direction and a function of the ratio of one or a pair of sub-peak induced voltages in the Y-axis direction to the corrected main peak induced voltage in the Y-axis direction with respect to an each tilt angle in the X-axis and Y-axis direction.

16. The angle information detecting method according to claim 13, wherein the angle information detecting step uses parameters indicating variations in a detected value of the induced voltage for each sensor coil, and parameters indicating variations in the ratio of the sub-peak value to the corrected main peak value for the detection width of each sensor coil.

17. The angle information detecting method according to claim 13, wherein the angle information detecting step uses parameters indicating variations in the ratio of the sub-peak value of each sub-division to the corrected main peak value when the detection width of the sensor coil is divided into a plurality of sub-divisions.

18. The angle information detecting method according to claim 11, wherein the induced voltage distribution converting step further comprises deducing an induced voltage distribution function using interpolation calculation, and subjecting the induced voltage distribution function to a translation operation in the direction of the axis.

19. The angle information detecting method according to claim 16, wherein the induced voltage distribution function is represented as a function of inter-sensor-coil coordinates applicable to the detection width of any of the sensor coils.

20. The angle information detecting method according to claim 17, wherein the induced voltage distribution function is represented as a function of alternative coordinates which are the inter-sensor-coil coordinates including the translation operation.

21. A digitizer tablet system for detecting tilt of a stylus relative to a tablet, the digitizer tablet system comprising:

said tablet including a plurality of parallel conductors aligned in each of the X and Y axial directions for detecting signals from said stylus in order to detect coordinate information;

said stylus for indicating coordinate location on said tablet by way of said signals;

means for detecting a main peak signal and at least one sub-peak signal in at least one of said axial directions, said main peak signal generally indicating the position of said stylus in said one axial direction and said sub-peak signal being used for detection of stylus tilt;

interpolation means for interpolating the main peak signal in order to obtain coordinate data of said stylus relative to said tablet;

converting means for converting one of said (i) main peak signal, and (ii) said sub-peak signal to a converted form that is different than its original form, so that said converted signal in its converted form is similar to the other non-converted signal with respect to induced signal distribution; and stylus tilt detection means for using said converted signal in its converted form to detect a degree of tilt of said stylus relative to said tablet.

22. The digitizer tablet system of claim 21, further comprising calculating means for calculating the degree of tilt of said stylus in the X axial direction as a function of main peak and auxiliary peak signals detected in each of the X axial direction and the Y axial direction.

* * * * *